US012797969B2

(12) United States Patent
Shitrit

(10) Patent No.: US 12,797,969 B2
(45) Date of Patent: Nov. 17, 2026

(54) CUTTING HEAD HAVING TWO PAIRS OF CUTTING ARMS WITH UNEQUAL CUTTING DIAMETERS, AND ROTARY CUTTING TOOL

(71) Applicant: ISCAR, LTD., Tefen (IL)

(72) Inventor: Shim'on Shitrit, Kibbutz Metsuba (IL)

(73) Assignee: Iscar, Ltd., Tefen (IL)

( * ) Notice: Subject to any disclaimer, the term of this patent is extended or adjusted under 35 U.S.C. 154(b) by 322 days.

(21) Appl. No.: 18/619,417

(22) Filed: Mar. 28, 2024

(65) Prior Publication Data

US 2024/0390991 A1 Nov. 28, 2024

Related U.S. Application Data

(60) Provisional application No. 63/503,727, filed on May 23, 2023.

(51) Int. Cl.
*B23B 51/00* (2006.01)

(52) U.S. Cl.
CPC ...... *B23B 51/0003* (2022.01); *B23B 51/0005* (2022.01); *B23B 2251/14* (2013.01); *B23B 2251/182* (2022.01); *B23B 2251/204* (2013.01)

(58) Field of Classification Search
CPC ............ B23B 51/0003; B23B 51/0005; B23B 2251/14; B23B 2251/182; B23B 2251/204
See application file for complete search history.

(56) References Cited

U.S. PATENT DOCUMENTS

| | | | | |
|---|---|---|---|---|
| 5,957,631 A * | 9/1999 | Hecht | B23B 51/00 408/230 |
| 6,012,881 A * | 1/2000 | Scheer | B23B 51/02 408/233 |
| 6,109,841 A * | 8/2000 | Johne | B23B 51/00 408/233 |
| 6,276,879 B1 * | 8/2001 | Hecht | B23B 31/008 408/232 |

(Continued)

OTHER PUBLICATIONS

International Search Report dated Jul. 26, 2024, issued in PCT counterpart application No. PCT/IL2024/050405.

(Continued)

*Primary Examiner* — Ryan J. Walters
(74) *Attorney, Agent, or Firm* — Womble Bond Dickinson (US) LLP

(57) ABSTRACT

A cutting head rotatable about a head axis has a pair of first cutting arms circumferentially alternating with a pair of second cutting arms. Each first cutting arm has a radially extending first cutting edge, which includes a first radially outer and a first radially inner cutting-edge portion. The first radially inner cutting-edge portion defines an imaginary first circle having a first diameter, and has a first inner cutting profile. Each second cutting arm has a radially extending second cutting edge. The second cutting edge defines an imaginary second circle having a second diameter, and has a second cutting profile. The first diameter is greater than the second diameter, and the first inner cutting profile is identical to the second cutting profile. A rotary cutting tool has an elongated tool shank and the cutting head of the type described above disposed at a front end of the tool shank.

23 Claims, 7 Drawing Sheets

(56) References Cited

U.S. PATENT DOCUMENTS 6,582,164 B1 * 6/2003 McCormick .......... B23B 31/113 408/230
7,309,196 B2 * 12/2007 Ruy Frota de Souza .................. B23B 51/00 408/227
7,360,974 B2 * 4/2008 Borschert ............... B23B 51/00 408/230
7,377,730 B2 * 5/2008 Hecht ..................... B23B 51/00 408/1 R
7,467,915 B2 * 12/2008 de Souza, Filho ..... B23B 51/00 408/231
7,559,382 B2 * 7/2009 Koch ...................... E21B 10/58 175/420.1
7,972,094 B2 * 7/2011 Men ........................ B23B 51/02 408/233
8,021,088 B2 * 9/2011 Hecht ..................... B23B 51/02 408/1 R
8,534,966 B2 * 9/2013 Hecht ..................... B23B 51/02 408/230
8,556,552 B2 * 10/2013 Hecht ..................... B23B 51/02 408/231
8,784,018 B2 * 7/2014 Pabel ...................... B23B 51/02 408/233
8,882,413 B2 * 11/2014 Hecht ..................... B23B 51/02 408/231
8,992,141 B2 * 3/2015 Hecht ..................... B23B 51/02 408/230
8,992,142 B2 3/2015 Hecht
9,028,180 B2 * 5/2015 Hecht ..................... B23B 51/02 408/230
10,071,430 B2 * 9/2018 Frota de Souza Filho .................. B23B 51/02
10,173,271 B2 * 1/2019 Hecht ..................... B23B 51/02
11,110,521 B2 9/2021 Hecht
11,951,553 B2 * 4/2024 Shitrit ................. B23B 51/0003
12,109,635 B2 * 10/2024 Shitrit ................. B23B 51/0003
2003/0118414 A1 * 6/2003 Fuss ...................... E21B 10/445 408/230
2008/0110679 A1 5/2008 Koch
2008/0118317 A1 5/2008 Assel
2009/0116920 A1 5/2009 Bae
2012/0315101 A1 12/2012 Osawa et al.
2015/0266107 A1 9/2015 Gonen et al.
2016/0375499 A1 12/2016 Jäger et al.
2017/0028480 A1 2/2017 Schwägerl
2017/0100784 A1 4/2017 Frota De Souza Filho et al.
2018/0029140 A1 2/2018 Gonen et al.
2018/0065191 A1 3/2018 Hecht
2019/0275594 A1 9/2019 Hecht
2019/0291189 A1 9/2019 Onchi
2019/0375029 A1 12/2019 Katagiri
2020/0108449 A1 4/2020 Brodski et al.
2021/0205900 A1 7/2021 Miller
2021/0362244 A1 11/2021 Hecht
2022/0305571 A1 9/2022 Shitrit et al.
2023/0150036 A1 * 5/2023 Shitrit ................. B23B 51/0003 407/30

OTHER PUBLICATIONS

Written Opinion dated Jul. 26, 2024, issued in PCT counterpart application No. PCT/IL2024/050405.

* cited by examiner

CUTTING HEAD HAVING TWO PAIRS OF CUTTING ARMS WITH UNEQUAL CUTTING DIAMETERS, AND ROTARY CUTTING TOOL

RELATED APPLICATIONS

Priority is claimed to U.S. Provisional Patent Application No. 63/503,727 filed May 23, 2023. The contents of the aforementioned application are incorporated by reference in their entirety.

FIELD OF THE INVENTION

The present invention relates to a cutting head having two pairs of cutting arms and a rotary cutting tool having such cutting head, for use in drilling operations, and for metal cutting drilling operations in particular.

BACKGROUND OF THE INVENTION

Within the field of rotary cutting tools used in drilling operations, there are some examples of cutting heads having two pairs of cutting arms.

US 2008/110679 A1 discloses a one-piece drilling head which is to be secured, in a material-locking manner, at an end of a helical shaft of a drill. The drilling head is formed of hard material and includes four radially extending legs, in a cross-shaped manner, forming, respectively, two diametrically opposite main cutting edges and two auxiliary cutting edges. The main cutting edges and the auxiliary cutting edges extend, proceeding from a drilling head drilling head tip, monotonously and strictly axially up to a radially outer edge.

US 2008/118317 A1 discloses a one-piece drilling head, which is securable, in a material-locking manner, on an axial end of a helical shaft of a drill, is formed of a hard material and has four radially extending, in a cross-shaped manner, legs forming respective cutting edges, and a tangential reinforcement provided at a radially outer rim of each leg in an axial region of a cutting edge.

US 2021/205900 A1 discloses a drill, in particular a spiral drill, comprising a base body extending substantially longitudinally in a direction axial to a drill axis, said base body comprising a drilling portion, wherein a radially inward core region in relation to the drill axis and a radially outer region are provided in the base body in the drilling portion, and the drilling portion comprises a plurality of spiral-shaped recesses in the outer region, and arranged between each two spiral-shaped recesses is a wall part, it is proposed that the drill comprises at least four main cutting edges, in particular exactly four main cutting edges.

It is an object of the present invention to provide an improved cutting head having two pairs of cutting arms.

It is also an object of the present invention to provide an improved cutting head which shares the high cutting and impact forces, occurring towards the cutting head's center, between two pairs of 'radially inner' cutting edges associated with the two pairs of cutting arms.

It is a further object of the present invention to provide an improved rotary cutting tool in which the cutting head is releasably secured to a tool shank.

It is yet a further object of the present invention to provide an improved rotary cutting tool in which the tool shank is efficiently and economically manufactured.

SUMMARY OF THE INVENTION

In accordance with the present invention, there is provided a cutting head rotatable about a head axis in a direction of rotation, the head axis establishing a head forward direction and a head rearward direction opposite the head forward direction, the cutting head comprising:

- a cutting portion having a cutting tip with an axially forwardmost tip point contained in the head axis, a pair of first cutting arms circumferentially alternating with a pair of second cutting arms,
  - each first cutting arm having a first cutting edge extending radially outwardly from the cutting tip, and a radially outward facing first head land surface,
    - the first cutting edges extending from the cutting tip to two radially outermost first cutting points defining, in a top view of the cutting head, an imaginary first circle having a first diameter and a center coincident with the head axis, each first cutting edge including a first radially outer cutting-edge portion and a first radially inner cutting-edge portion, and the imaginary first circle lying in a first plane perpendicular to the head axis, and
    - each first head land surface having a head leading edge extending axially rearwardly from its associated radially outermost first cutting point,
  - each second cutting arm having a second cutting edge extending radially outwardly from the cutting tip, and a radially outward facing second head land surface,
    - the second cutting edges extending to two radially outermost second cutting points defining, in a top view of the cutting head, an imaginary second circle having a second diameter and a center coincident with the head axis, the imaginary second circle lying in a second plane perpendicular to the head axis, wherein:

- the first diameter is greater than the second diameter,
- in a cross-section taken in a fifth plane containing the head axis and intersecting the first cutting arms, each first cutting edge has a first cutting profile and each first radially inner cutting-edge portion has a first inner cutting profile,
- in a cross-section taken in a sixth plane containing the head axis and intersecting the second cutting arms, each second cutting edge has a second cutting profile, and
- the first inner cutting profile is identical to the second cutting profile.

Also, in accordance with the present invention, there is provided a rotary cutting tool comprising:

- an elongated tool shank having a shank axis establishing a shank forward direction, and a shank rearward direction opposite the shank forward direction, and
- the above described cutting head disposed at a front end of the tool shank, wherein:

- a shank peripheral surface extends away from the front end of the tool shank along the shank axis, and
- the shank peripheral surface has exactly two shank flutes circumferentially alternating with exactly two shank land surfaces.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
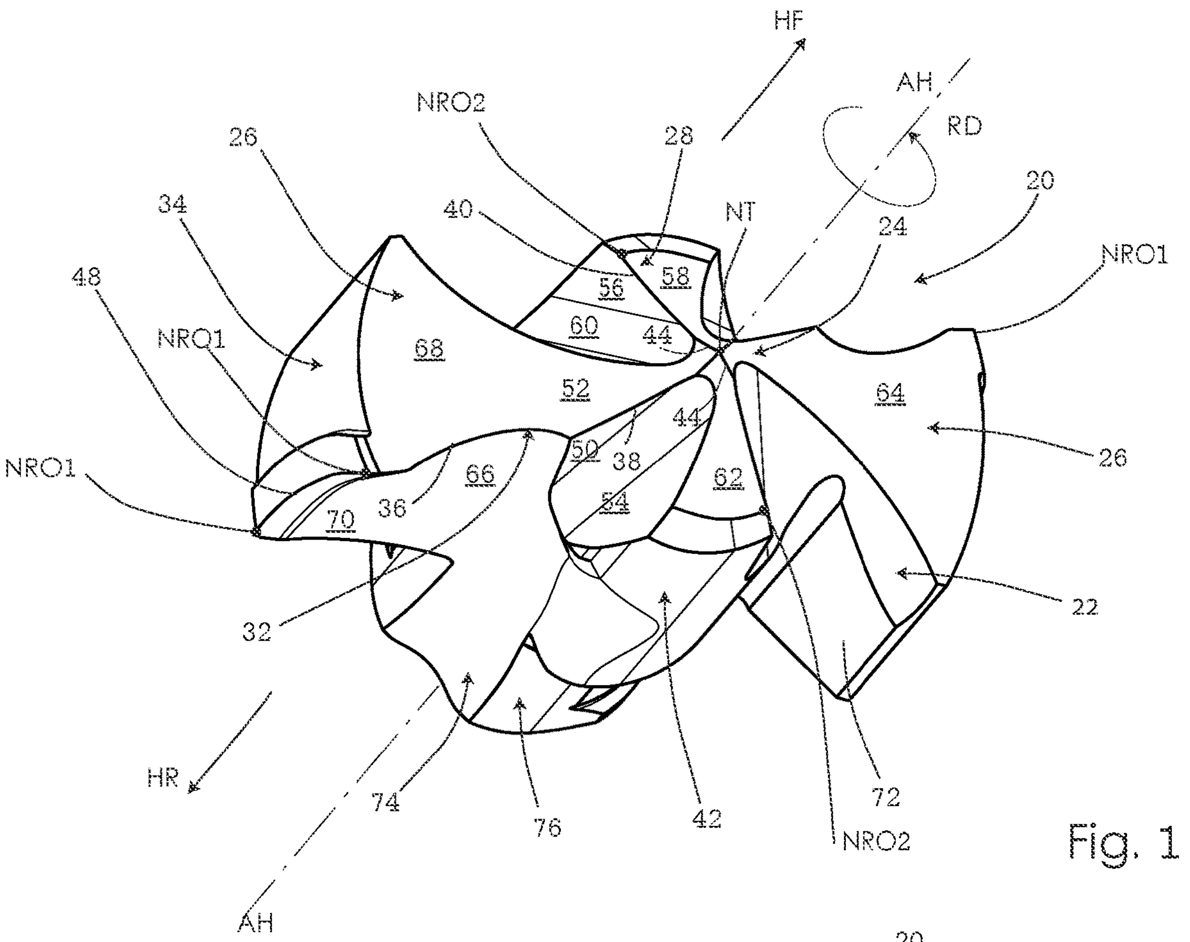
FIG. 1 is a perspective view of a cutting head in accordance with some embodiments of the present invention.

Attention is first drawn to FIGS. 1 to 4, showing a cutting head 20 rotatable about a head axis AH in a direction of rotation RD, the head axis AH establishing a head forward direction HF and a head rearward direction HR opposite to the head forward direction HF.

In some embodiments of the present invention, the cutting head 20 may be manufactured by form pressing and sintering a cemented carbide, such as tungsten carbide, and may be coated or uncoated.

As shown in FIGS. 1 to 4, the cutting head 20 comprises a cutting portion 22 having a cutting tip 24 with an axially forwardmost tip point NT contained in the insert axis AH, a pair of first cutting arms 26 circumferentially alternating with a pair of second cutting arms 28.

In some embodiments of the present invention, the cutting portion 22 may have a rearward facing bottom surface 30.

As shown in FIGS. 1 to 4, each first cutting arm 26 has a first cutting edge 32 extending radially outwardly from the cutting tip 24, and a radially outward facing first head land surface 34.

In some embodiments of the present invention, the pair of first cutting arms 26 may be identical.

Also, in some embodiments of the present invention, each first head land surface 34 may intersect the bottom surface 30.

Further, in some embodiments of the present invention, each first head land surface 34 may be convexly curved.

As shown in FIGS. 1 to 4, each first cutting edge 32 includes a first radially outer cutting-edge portion 36 and a first radially inner cutting-edge portion 38.

In some embodiments of the present invention, the pair of first cutting edges 32 may exhibit 2-fold rotational symmetry about the head axis AH.

Each second cutting arm 28 has a second cutting edge 40 extending radially outwardly from the cutting tip 24, and a radially outward facing second head land surface 42.

In some embodiments of the present invention, the pair of second cutting arms 28 may be identical.

Also, in some embodiments of the present invention, the pair of second cutting edges 40 may exhibit 2-fold rotational symmetry about the head axis AH.

Figure 3:
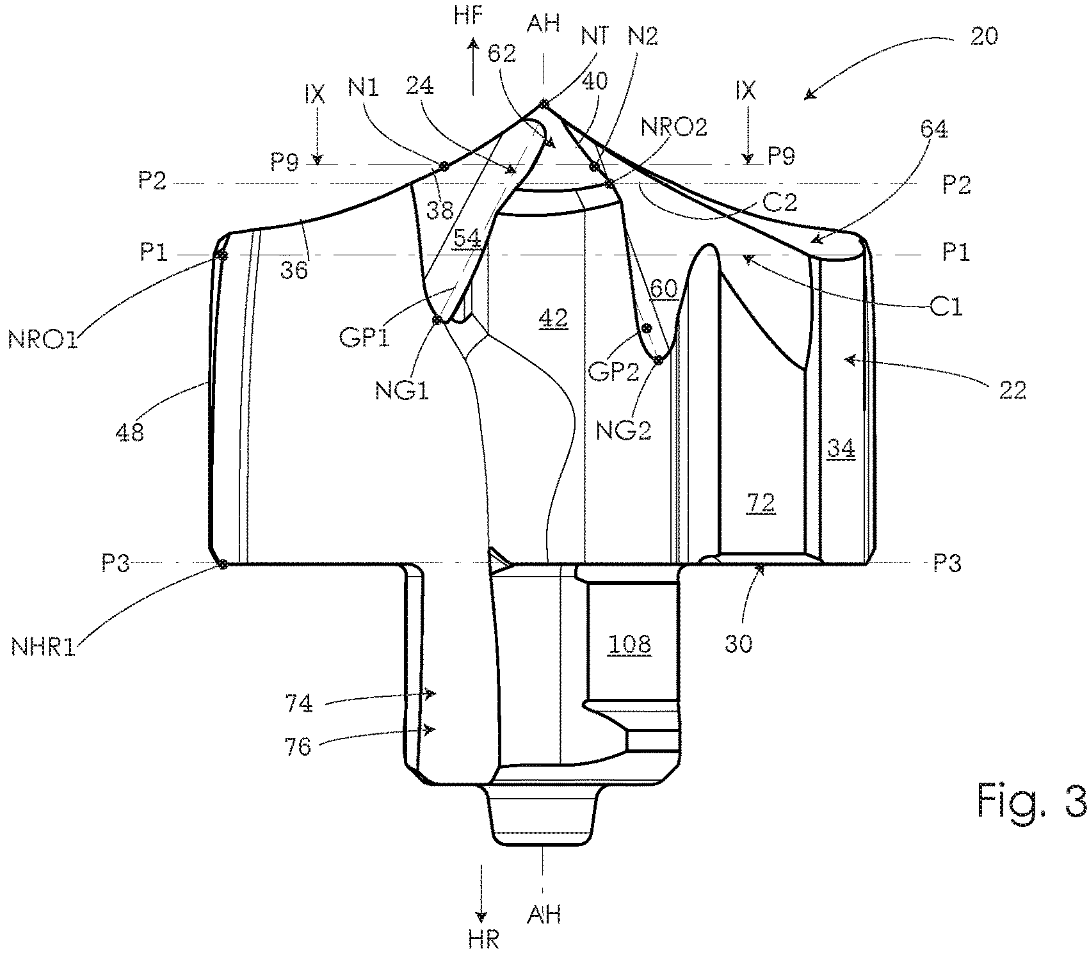
FIG. 3 is a side view of the cutting head shown in FIG. 1.

As shown in FIG. 3, each second head land surface 42 may intersect the bottom surface 30.

In some embodiments of the present invention, each second head land surface 42 may be convexly curved.

As shown in FIGS. 1 to 4, the pair of first cutting edges 32 extend from the cutting tip 24 to two radially outermost first cutting points NRO1 defining an imaginary first circle C1 having a first diameter D1 and a center coincident with the head axis AH, and the pair of second cutting edges 40 extend to two radially outermost second cutting points NRO2 defining an imaginary second circle C2 having a second diameter D2 and a center coincident with the head axis AH.

In some embodiments of the present invention, both pairs of first and second cutting edges 32, 40 extend radially outwardly from the tip point NT. For such embodiments of the present invention, each first radially inner cutting-edge portion 38 and each second cutting edge 40 may include a chisel edge portion 44 extending from the tip point NT.

For such embodiments of the present invention in which the cutting head 20 has four chisel edge portions 44 extending from the tip point NT, it should be appreciated that the cutting tip 24 has a robust 'pyramid' shape.

Figure 4:
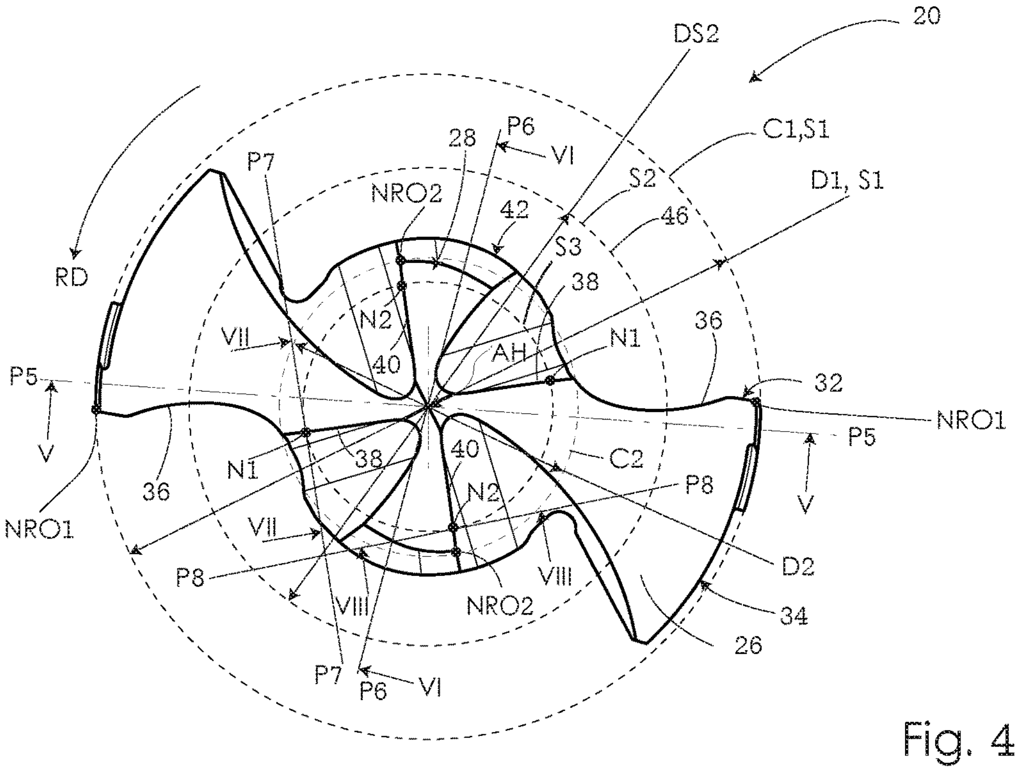
FIG. 4 is a top view of the cutting head shown in FIG. 1.

As shown in FIG. 4, the first diameter D1 is greater than the second diameter D2.

In some embodiments of the present invention, the second diameter D2 may be greater than thirty percent of the first diameter D1 and less than seventy percent of the first diameter D1, i.e., $D1*0.30<D2<D1*0.70$.

By configuring the cutting head 20 to have two pairs of 'radially inner' cutting edges, namely, the pair of first radially inner cutting-edge portions 38 and the pair of second cutting edges 40, it should be appreciated that the feed rate of each 'radially inner' cutting edge is half the feed rate of each first radially outer cutting-edge portion 36, and thus the high cutting and impact forces typically associated with very low cutting speeds, occurring towards the cutting head's center, are advantageously shared between said two pairs of 'radially inner' cutting edges.

As shown in FIG. 4, in a top view of the cutting head 20, the imaginary first circle C1 defines an imaginary first cylinder S1 extending along the head axis AH.

In some embodiments of the present invention, no portion of the cutting head 20 may extend outside the imaginary first cylinder S1.

Also, in some embodiments of the present invention, it should be appreciated that the imaginary first circle's first diameter D1 may define a cutting diameter DC of the cutting head 20.

As shown in FIG. 4, an imaginary second cylinder S2 has a circular cross-section centered about the head axis AH, the imaginary second cylinder S2 having a second cylinder diameter DS2 greater than the second diameter D2 and less than the first diameter D1, i.e., $D2<DS2<D1$.

In some embodiments of the present invention, the pair of second cutting arms 28 may be located entirely inside the imaginary second cylinder S2, and an imaginary second cylinder surface 46 of the imaginary second cylinder S2 may intersect the pair of first cutting arms 26.

In some embodiments of the present invention, the imaginary second cylinder surface 46 may intersect the pair of first radially outer cutting-edge portions 36.

Also, in some embodiments of the present invention, the cutting head 20 may exhibit 2-fold rotational symmetry about the head axis AH.

As shown in FIG. 3, the imaginary first circle C1 lies on a first plane P1 perpendicular to the head axis AH, and the imaginary second circle C2 lies on a second plane P2 perpendicular to the head axis AH.

In some embodiments of the present invention, the first and second planes P1, P2 may be non-coplanar.

Also, in some embodiments of the present invention, the first plane P1 may be located axially rearward of the second plane P2.

Further, some embodiments of the present invention, each first cutting edge 32 may monotonically extend axially rearwardly from the cutting tip 24 to its radially outermost first cutting point NRO1.

Yet further, in some embodiments of the present invention, each second cutting edge 40 may monotonically extend axially rearwardly from the cutting tip 24 to its radially outermost second cutting point NRO2.

As shown in FIG. 3, each first head land surface 34 may have a head leading edge 48 extending axially rearwardly from its associated radially outermost first cutting point NRO1 to an axially rearwardmost head leading endpoint NHR1.

Also, as shown in FIG. 3, the bottom surface 30 may define a third plane P3 perpendicular to the head axis AH.

In some embodiments of the present invention, the bottom surface 30 may be planar.

Also, in some embodiments of the present invention, each head leading endpoint NHR1 may be located on or immediately adjacent the third plane P3.

Figure 2:
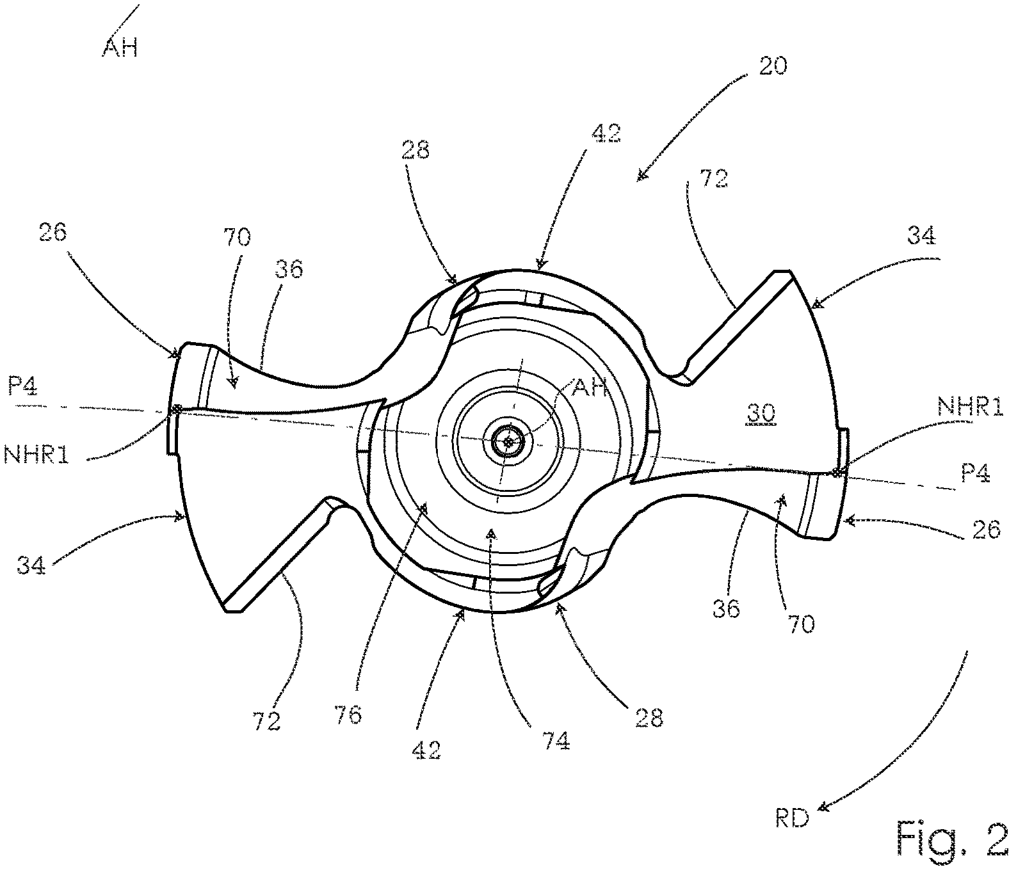
FIG. 2 is a bottom view of the cutting head shown in FIG. 1.

As shown in FIG. 2, the two head leading endpoints NHR1 may lie on a fourth plane P4 containing the head axis AH.

Figure 5:
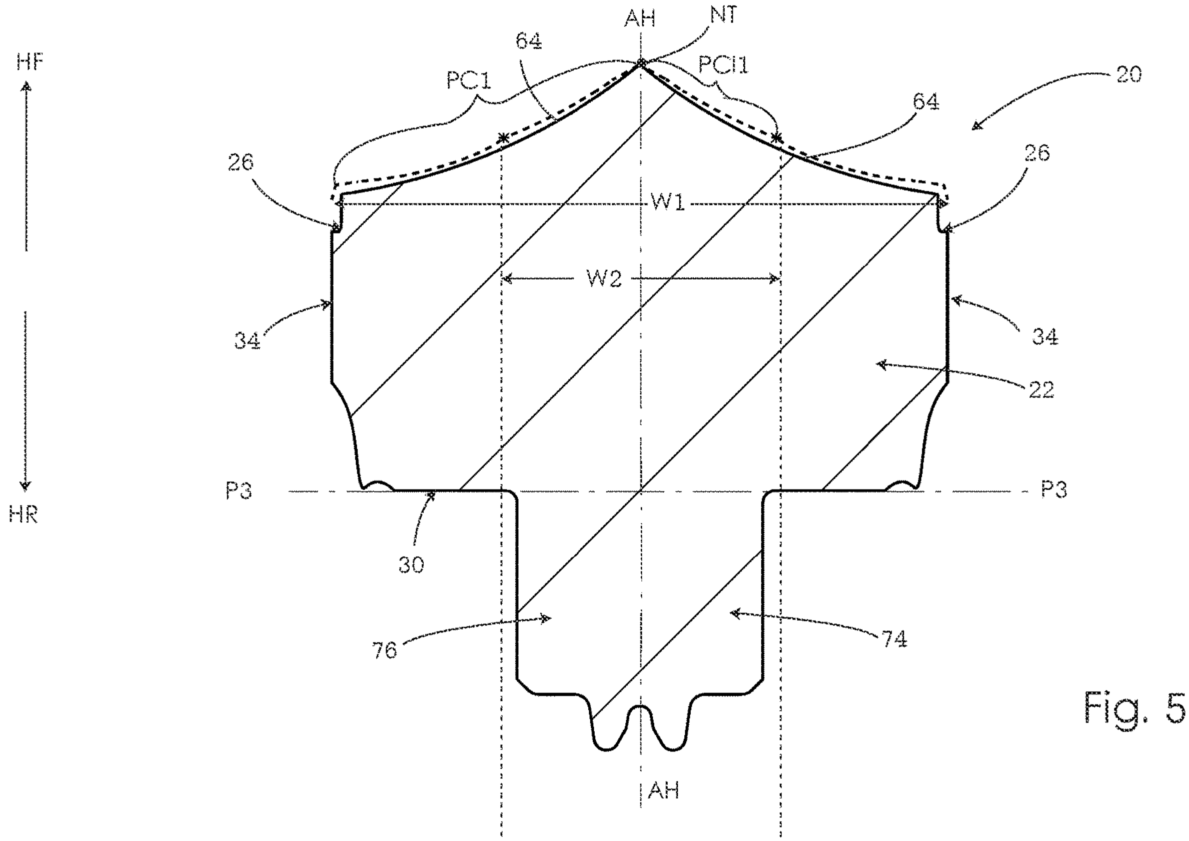
FIG. 5 is a cross-sectional view of the cutting head shown in FIG. 4, taken along the line V-V.

As shown in FIG. 5, in a cross-section taken in a fifth plane P5 containing the head axis AH and intersecting the pair of first cutting arms 26, each first cutting edge 32 has a first cutting profile PC1, and the first radially inner cutting-edge portion 38 of each first cutting edge 32 has first inner cutting profile PCI1.

Figure 6:
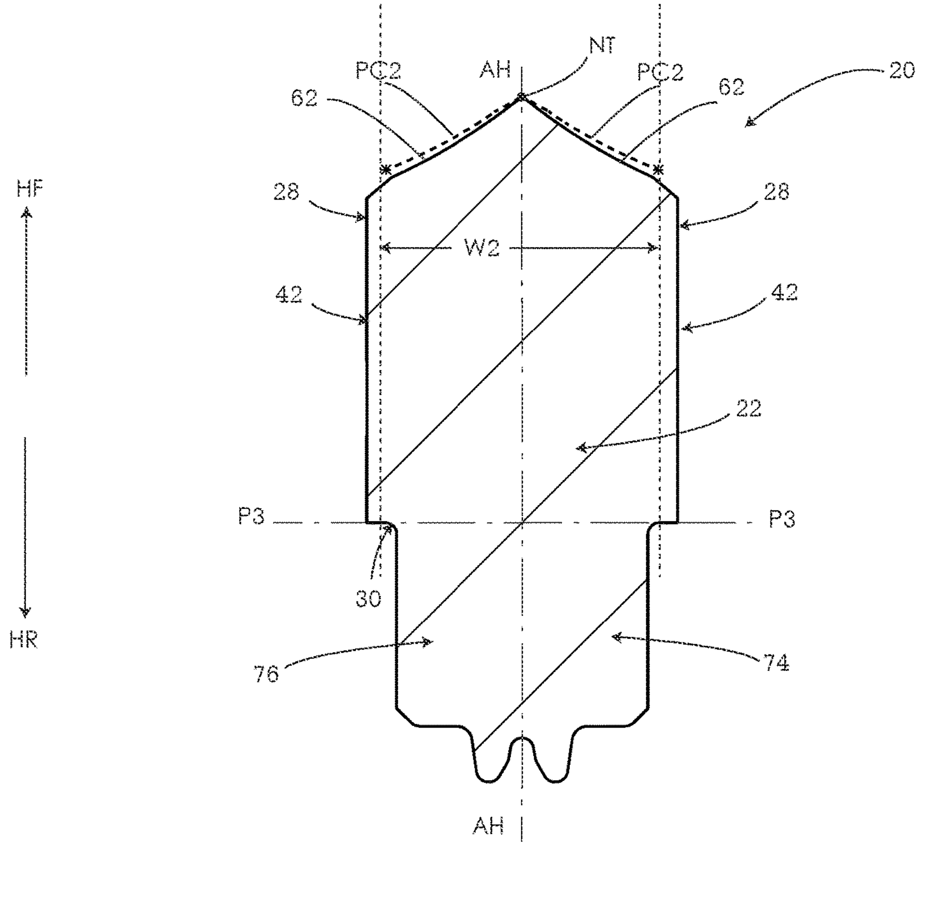
FIG. 6 is a cross-sectional view of the cutting head shown in FIG. 4, taken along the line VI-VI.

As shown in FIG. 6, in a cross-section taken in a sixth plane P6 containing the head axis AH and intersecting the pair of second cutting arms 28, each second cutting edge 40 has a second cutting profile PC2. The sixth plane P6 may be perpendicular to the fifth plane P5.

It should be appreciated throughout the specification and claims that the term 'cutting profile' refers to the rotational projection of a cutting edge or cutting-edge portion about the head axis AH onto any plane containing the head axis AH, i.e., any radial plane.

As shown in FIGS. 5 and 6, the first inner cutting profile PCI1 is identical to the second cutting profile PC2.

It should be appreciated that the first inner cutting profile PCI1 and the second cutting profile PC2 may be coincident when rotationally projected onto the same radial plane, for example, when rotationally projected onto the fifth plane P5 or the sixth plane P6.

By configuring the first inner cutting profile PCI1 to be identical to the second cutting profile PC2, it should be appreciated the high cutting and impact forces typically associated with very low cutting speeds, occurring towards the cutting head's center, are advantageously equally shared between the pair of first radially inner cutting-edge portions 38 and the pair of second cutting edges 40.

While the first cutting profile PC1 has a first cross-sectional profile width W1 equal to D1, the first inner cutting profile PCI1 and the second cutting profile PC2 both have a second cross-sectional profile width W2 equal to D2. Thus, in some embodiments, $W1*0.30<W2<W1*0.70$. It is understood here that a cross-sectional profile width is measured in a direction perpendicular to the head axis AH.

In some embodiments of the present invention, the cutting head 20 may be preferably used in metal cutting drilling operations.

Also, in some embodiments of the present invention, each first radially inner cutting-edge portion 38 may be identical to each second cutting edge 40.

Yet further, in some embodiments of the present invention, the pair of first radially inner cutting-edge portions 38 and the pair of second cutting edges 40 may exhibit 4-fold rotational symmetry about the head axis AH.

As shown in FIG. 1, each first radially inner cutting-edge portion 38 is formed at the intersection of a first inner rake surface 50 facing the direction of rotation RD, and an axially forward-facing first inner relief surface 52.

In some embodiments of the present invention, each first inner rake surface 50 may be formed on a first point thinning gash 54.

As shown in FIG. 1, each second cutting edge 40 is formed at the intersection of a second rake surface 56 facing the direction of rotation RD, and an axially forward facing second relief surface 58.

In some embodiments of the present invention, each second rake surface 56 may be formed on a second point thinning gash 60.

Also, in some embodiments of the present invention, each second head land surface 42 may be intersected by one of the first point thinning gashes 54 and one of the second point thinning gashes 60.

As shown in FIG. 1, each second cutting arm 28 has an axially forward facing second front surface 62.

In some embodiments of the present invention, each second front surface 62 may be intersected by the adjacent rotationally trailing first point thinning gash 54.

Also, in some embodiments of the present invention, each second relief surface 58 may be disposed on one of the second front surfaces 62.

Further, in some embodiments of the present invention, each second front surface 62 may be intersected by its associated second head land surface 42.

As shown in FIG. 1, each first cutting arm 26 has an axially forward facing first front surface 64.

In some embodiments of the present invention, each first front surface 64 may be intersected by the adjacent rotationally trailing second point thinning gash 60.

Also, in some embodiments of the present invention, each first inner relief surface 52 may be disposed on one of the first front surfaces 64.

Further, in some embodiments of the present invention, each first front surface 64 may be intersected by its associated first head land surface 34.

As shown in FIG. 1, each first radially outer cutting-edge portion 36 is formed at the intersection of a first outer rake surface 66 facing the direction of rotation RD, and an axially forward-facing first outer relief surface 68.

In some embodiments of the present invention, each first outer relief surface 68 may be disposed on one of the first front surfaces 64.

As shown in FIG. 1, the first outer rake surface 66 may be formed on an axially rearwardly extending chip evacuation flute 70.

It should be appreciated that during a cutting operation, cutting chips produced by each first radially outer cutting-edge portion 36 flow axially rearwardly along the associated chip evacuation flute 70.

In some embodiments of the present invention, each chip evacuation flute 70 may intersect the bottom surface 30.

Also, in some embodiments of the present invention, the imaginary second cylinder surface 46 may intersect the two chip evacuation flutes 70.

It should be appreciated that during a cutting operation, cutting chips produced by each first radially inner cutting-edge portion 38 flow axially rearwardly along the associated first point thinning gash 54 before continuing to flow axially rearwardly along the associated chip evacuation flute 70.

For embodiments of the present invention in which the first diameter D1 is greater than the second diameter D2, it should appreciated that sufficient space is provided beyond the radially outer extent of each second cutting arm 28 to enable cutting chips produced by the associated second cutting edge 40 to flow opposite the direction of rotation RD after exiting the associated second point thinning gash 60, before continuing to flow axially rearwardly along the rotationally trailing chip evacuation flute 70.

As shown in FIG. 4, an imaginary third cylinder S3 has a circular cross-section centered about the head axis AH. The imaginary third cylinder S3 intersects the pair of first radially inner cutting-edge portions 38 at two first intersection points N1 and the pair of second cutting edges 40 at two second intersection points N2.

Figure 7:
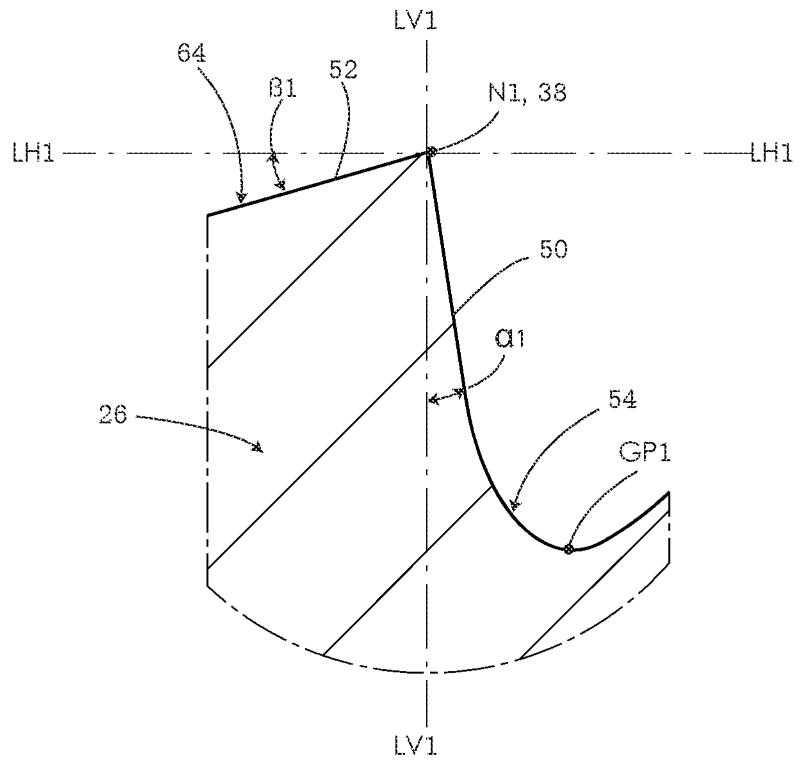
FIG. 7 is a cross-sectional view of the cutting head shown in FIG. 4, taken along the line VII-VII.

As shown in FIG. 7, in a cross-section taken in a seventh plane P7 tangential to the imaginary third cylinder S3 and containing one of the first intersection points N1, the first inner rake surface 50 forms an acute first inner rake angle $\alpha 1$ with a first imaginary vertical straight line LV1 lying on the imaginary third cylinder S3 and parallel to the head axis AH.

Figure 8:
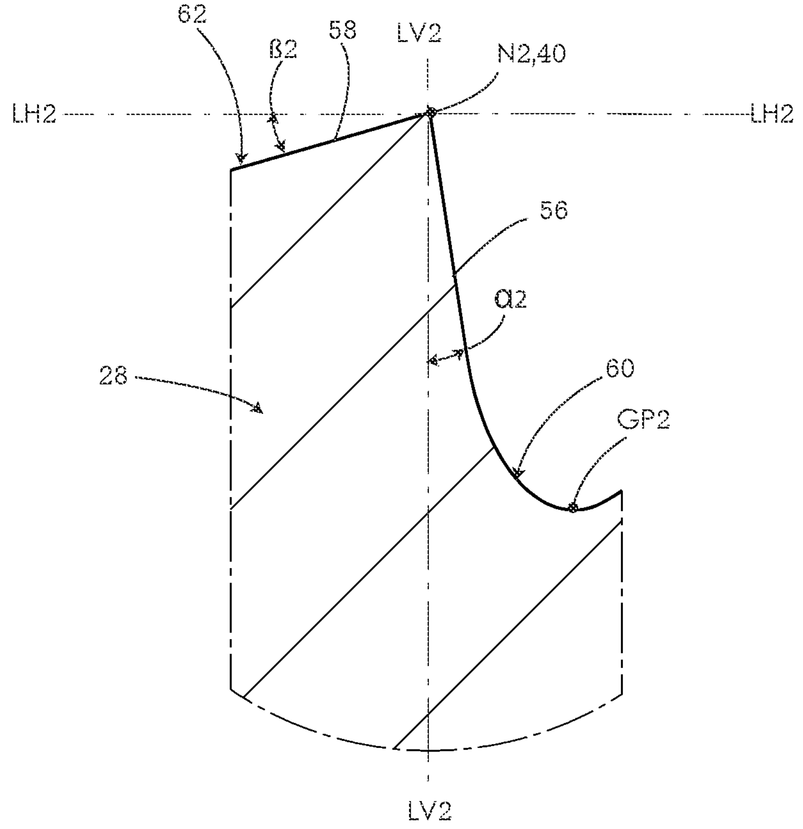
FIG. 8 is a cross-sectional view of the cutting head shown in FIG. 4, taken along the line VIII-VIII.

As shown in FIG. 8, in a cross-section taken in an eighth plane P8 tangential to the imaginary third cylinder S3 and containing one of the second intersection points N2, the second rake surface 56 forms an acute second rake angle $\alpha 2$ with a second imaginary vertical straight line LV2 lying on the imaginary third cylinder S3 and parallel to the head axis AH.

In some embodiments of the present invention, the first inner rake angle $\alpha 1$ and the second rake angle $\alpha 2$ may be equal.

Also, in some embodiments of the present invention, the first inner rake angle $\alpha 1$ and the second rake angle $\alpha 2$ may be negative.

It should be appreciated throughout the specification and claims that the first inner rake angle $\alpha 1$ is negative for a configuration in which the first inner rake surface 50 extends rotationally forwardly as it extends away from its associated first radially inner cutting-edge portion 38.

It should also be appreciated throughout the specification and claims that the second rake angle $\alpha 2$ is negative for a configuration in which the second rake surface 56 extends rotationally forwardly as it extends away from its associated second cutting edge 40.

As the two pairs of 'radially inner' cutting edges, namely, the pair of first radially inner cutting-edge portions 38 and the pair of second cutting edges 40, are susceptible to greater impact forces than the pair of first radially outer cutting-edge portions 36 due to their relatively lower cutting speeds, especially at high feed rates, it should be appreciated that configuring each of the first inner rake angle $\alpha 1$ and the second rake angle $\alpha 2$ to be negative increases the stability and robustness of said two pairs of 'radially inner' cutting edges, thus prolonging the operative life thereof.

Further, in some embodiments of the present invention, the first inner rake angle $\alpha 1$ and the second rake angle $\alpha 2$ may have a value between three and fifteen degrees, i.e., $3° < \alpha 1 < 15°$, and $3° < \alpha 2 < 15°$.

As shown in FIG. 7, in the cross-section taken in the seventh plane P7, the first inner relief surface 52 forms an acute first inner relief angle $\beta 1$ with a first imaginary horizontal straight line LH1 containing the aforementioned one of the first intersection points N1 and perpendicular to the first imaginary vertical straight line LV1.

It should be appreciated throughout the specification and claims that in the cross-section taken in the seventh plane P7, the first inner relief surface 52 extends axially rearwardly as it extends away from the first radially inner cutting-edge portion 38.

As shown in FIG. 8, in the cross-section taken in the eighth plane P8, the second relief surface 58 forms an acute second relief angle $\beta 2$ with a second imaginary horizontal straight line LH2 containing the aforementioned one of the second intersection points N2 and perpendicular to the second imaginary vertical straight line LV2.

It should be appreciated throughout the specification and claims that in the cross-section taken in the eighth plane P8, the second relief surface 58 extends axially rearwardly as it extends away from the second cutting edge 40.

In some embodiments of the present invention, the first inner relief angle $\beta 1$ and the second relief angle $\beta 2$ may be equal.

Further, in some embodiments of the present invention, the first inner relief angle $\beta 1$ and the second relief angle $\beta 2$ may have a value between five and twenty degrees, i.e., $5° < \beta 1 < 20°$, and $5° < \beta 2 < 20°$.

Figure 9:
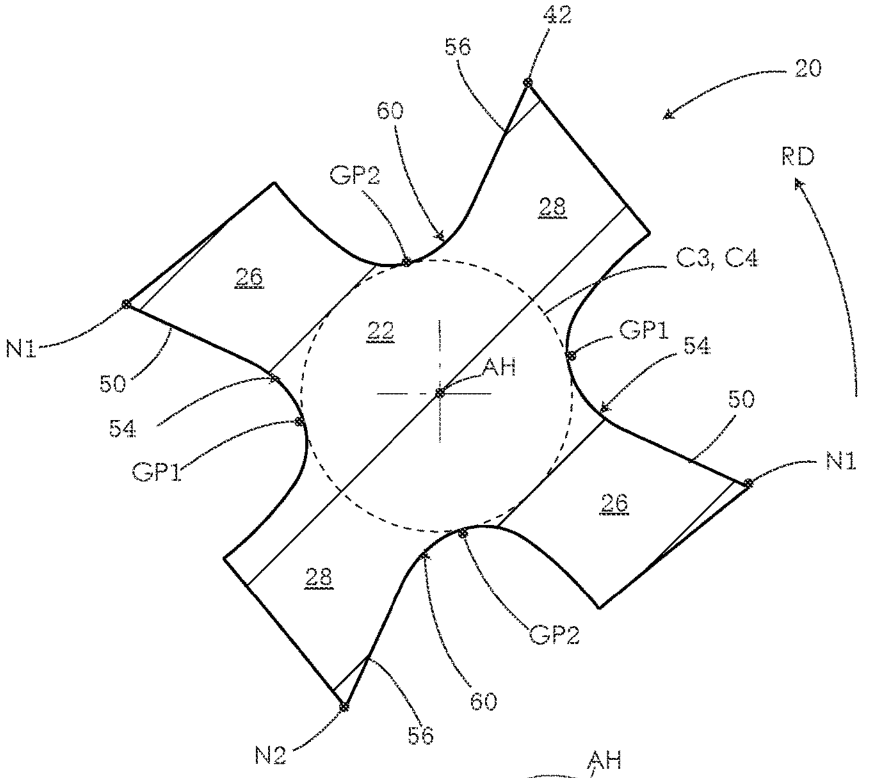
FIG. 9 is a cross-sectional view of the cutting head shown in FIG. 3, taken along the line IX-IX.

As shown in FIG. 9, in a cross-section taken in a ninth plane P9 perpendicular to the head axis AH and intersecting the pair of first radially inner cutting-edge portions 38 and the pair of second cutting edges 40, an imaginary third circle C3 inscribes the two first point thinning gashes 54 and an imaginary fourth circle C4 inscribes the two second point thinning gashes 60.

In some embodiments of the present invention, the imaginary third and fourth circles C3, C4 may have respective centers coincident with the head axis AH.

Also, in some embodiments of the present invention, the imaginary third and fourth circles C3, C4 may be coincident.

Further, in some embodiments of the present invention, as shown in FIG. 3, the ninth plane P9 may contain the two first intersection points N1 and the two second intersection points N2.

As shown in FIG. 3, each first point thinning gash 54 has a first gash path GP1 extending away from the cutting tip 24, defined by a plurality of radially innermost gash points (not shown) from a series of cross-sections taken in planes perpendicular to the head axis AH and intersecting the first point thinning gash 54 along its axial extent.

In some embodiments of the present invention, each first gash path GP1 may monotonically extend radially outwardly from the cutting tip 24 to an axially rearwardmost first gash end point NG1.

Also, in some embodiments of the present invention, the imaginary third circle C3 may inscribe the two first point thinning gashes 54 at a point along each of their respective first gash paths GP1.

As shown in FIG. 3, each second point thinning gash 60 has a second gash path GP2 extending away from the cutting tip 24, defined by a plurality of radially innermost gash points (not shown) from a series of cross-sections taken in planes perpendicular to the head axis AH and intersecting the second point thinning gash 60 along its axial extent.

In some embodiments of the present invention, each second gash path GP2 may monotonically extend radially outwardly from the cutting tip 24 to an axially rearwardmost second gash end point NG2.

In some embodiments of the present invention, the imaginary fourth circle C4 may inscribe the two second point thinning gashes 60 at a point along each of their respective second gash paths GP2.

As shown in FIGS. 1 and 3, each first cutting arm 26 may include a torque transmission surface 72 facing opposite the direction of rotation RD.

In some embodiments of the present invention, each torque transmission surface 72 may intersect its associated first head land surface 34.

Also, in some embodiments of the present invention, each torque transmission surface 72 may be planar.

Further, in some embodiments of the present invention, the imaginary second cylinder surface 46 may intersect the two torque transmission surfaces 72.

As shown in FIGS. 2 and 3, the cutting head 20 may include a mounting portion 74 located axially rearward of the cutting portion 22.

In some embodiments of the present invention, the mounting portion 74 may have a central mounting stem 76 extending axially rearwardly along the head axis AH from the cutting portion's bottom surface 30.

Also, in some embodiments of the present invention, the central mounting stem 76 may have a circumferential outer stem surface 78.

Figure 10:
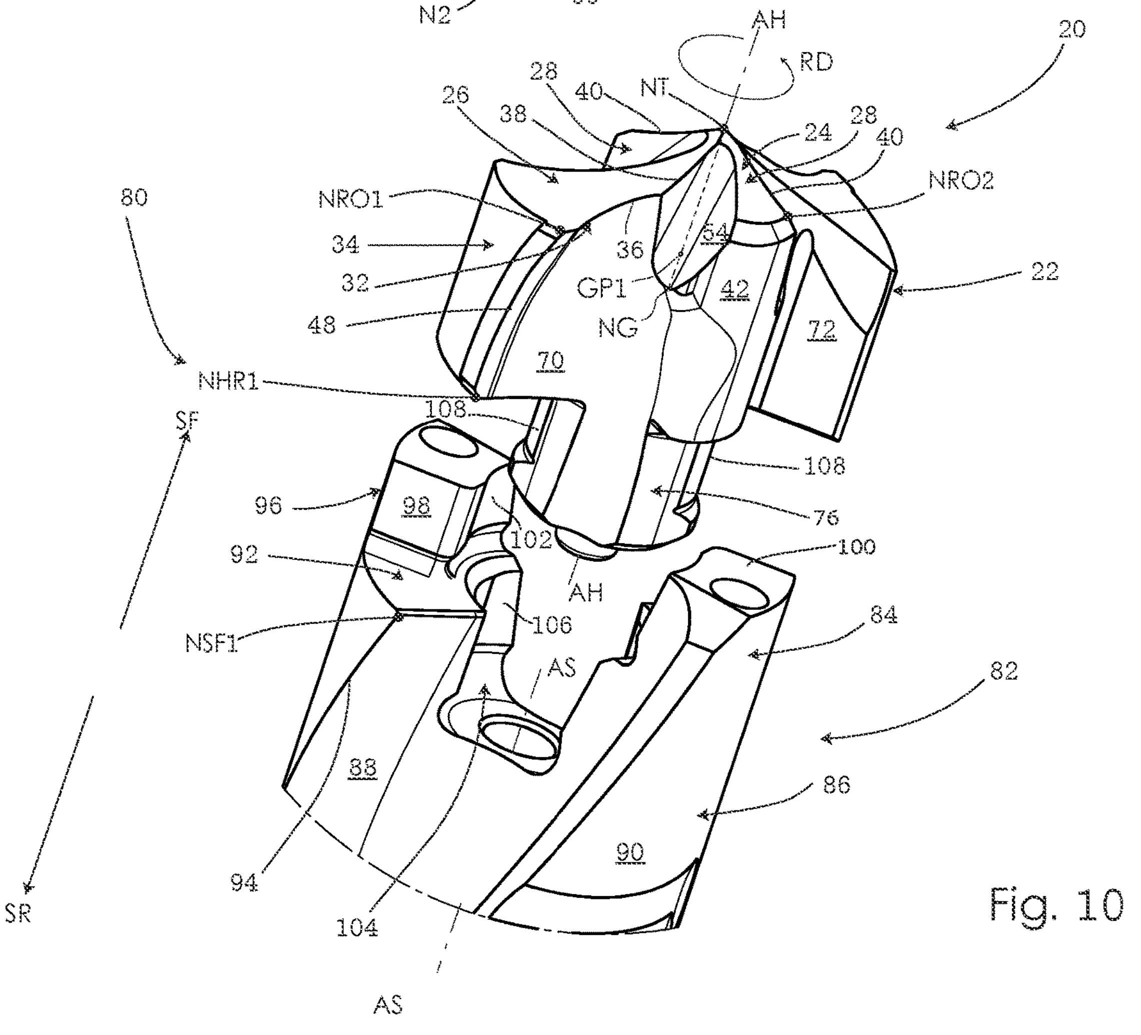
FIG. 10 is an exploded perspective view of a rotary cutting tool in accordance with some embodiments of the present invention.
Figure 11:
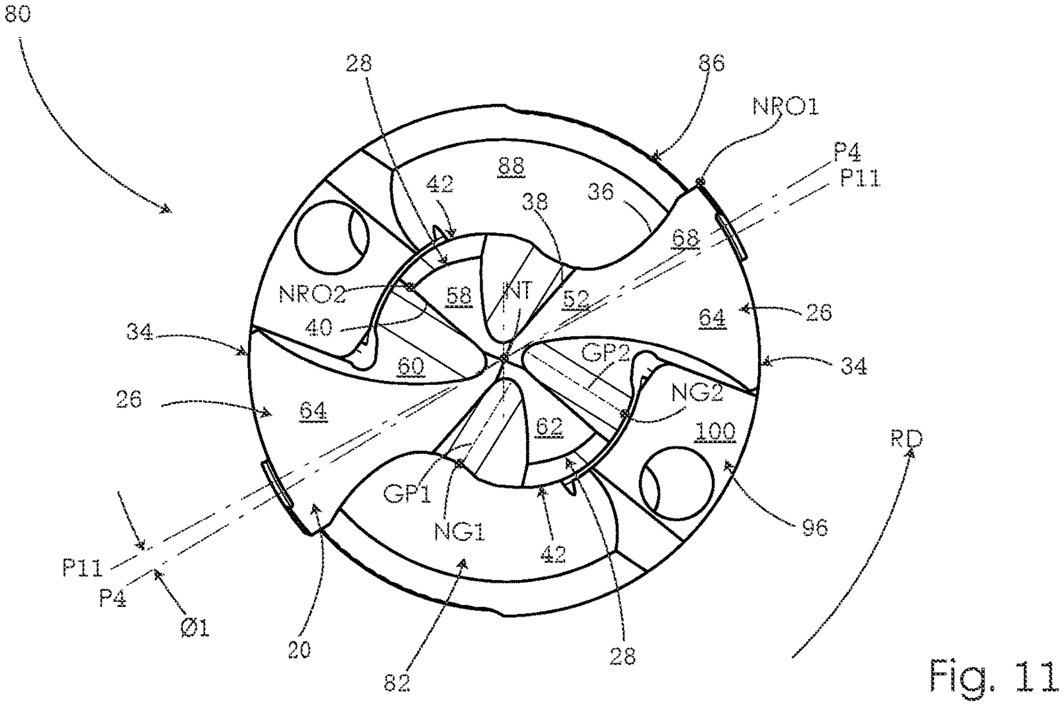
FIG. 11 is an end view of the rotary cutting tool shown in FIG. 10, in an assembled position.
Figure 12:
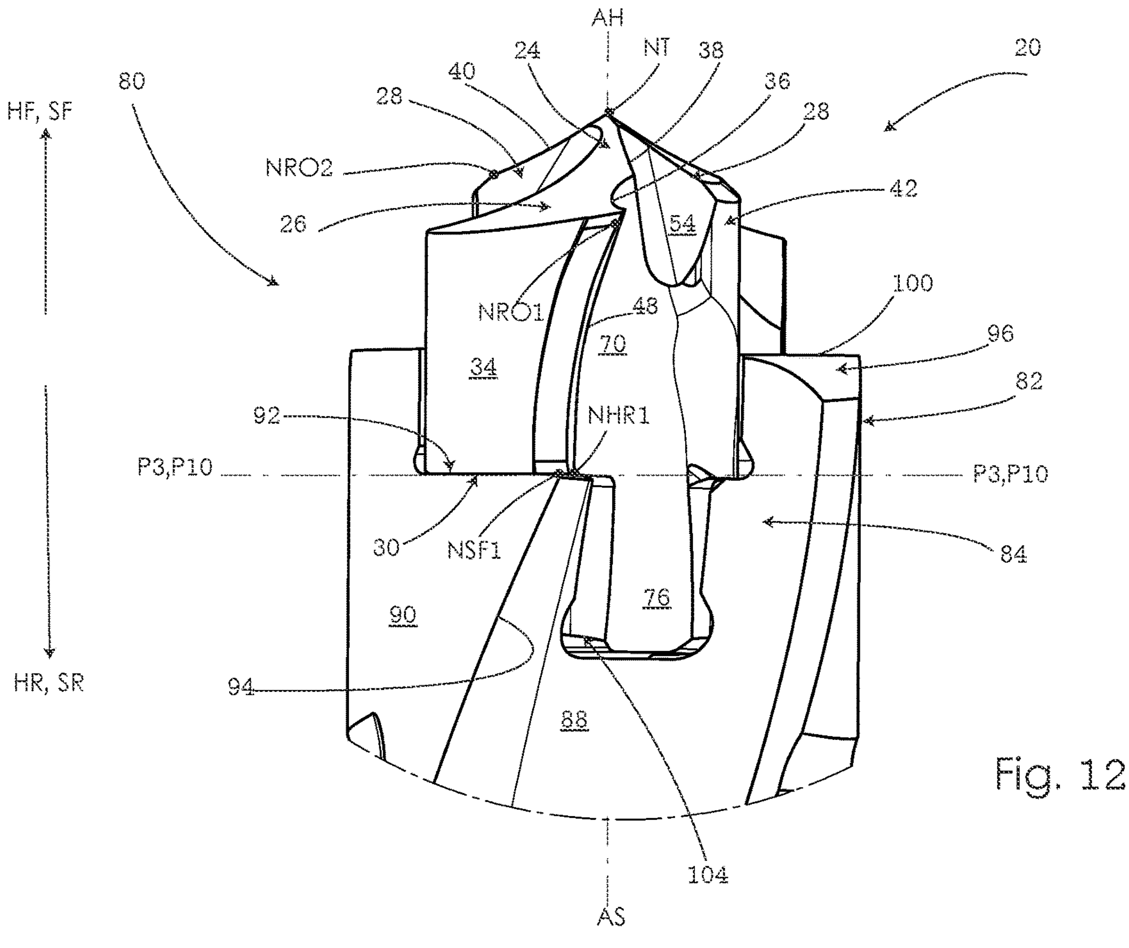
FIG. 12 is a side view of the rotary cutting tool shown in FIG. 10, in the assembled position.

Attention is now drawn to FIGS. 10 to 12, showing a rotary cutting tool 80 having an elongated tool shank 82 with a shank axis AS establishing a shank forward direction SF, and a shank rearward direction SR opposite the shank forward direction SF, and the cutting head 20 disposed at a front end 84 of the tool shank 82.

In some embodiments of the present invention, the cutting head 20 may be releasably secured to the front end 84 of the tool shank 82.

Configuring the cutting head 20 to be releasably secured to the tool shank 82 enables the cutting head 20 to be manufactured from a suitably hard material, such as tungsten carbide, and the tool shank 82 to be manufactured from a less hard and less expensive material, such as high-speed steel. The tool shank 82 may be reusable following disposal of a worn or damaged cutting head 20.

In other embodiments of the present invention (not shown), the cutting head 20 and the tool shank 82 may be integral parts of monolithic one-piece construction.

Figure 13:
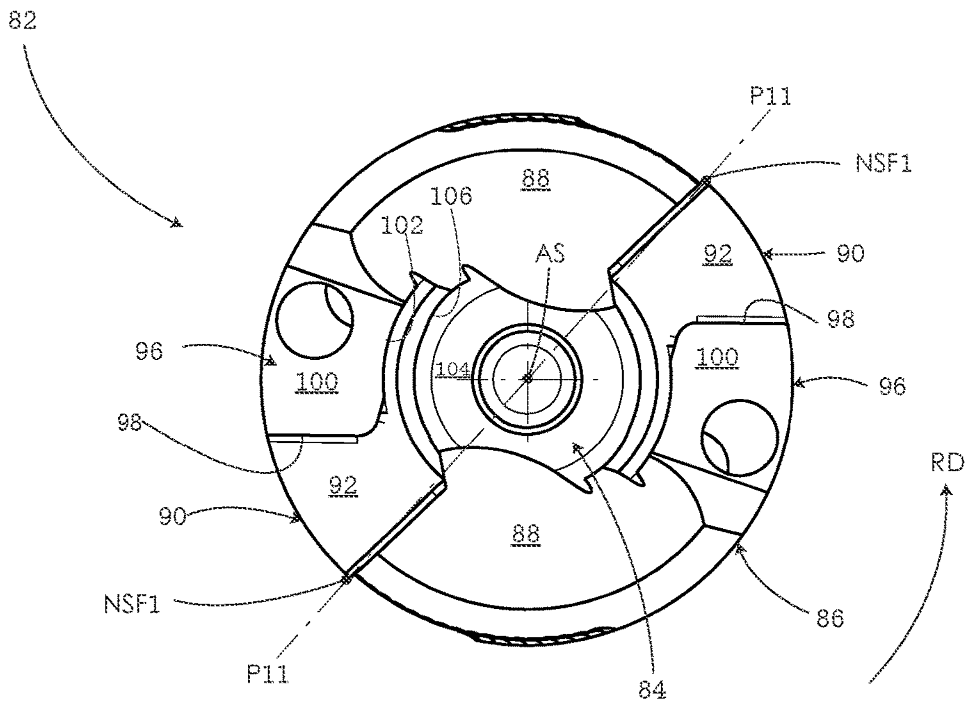
FIG. 13 is an end view of a tool shank in accordance with some embodiments of the present invention.
Figure 14:
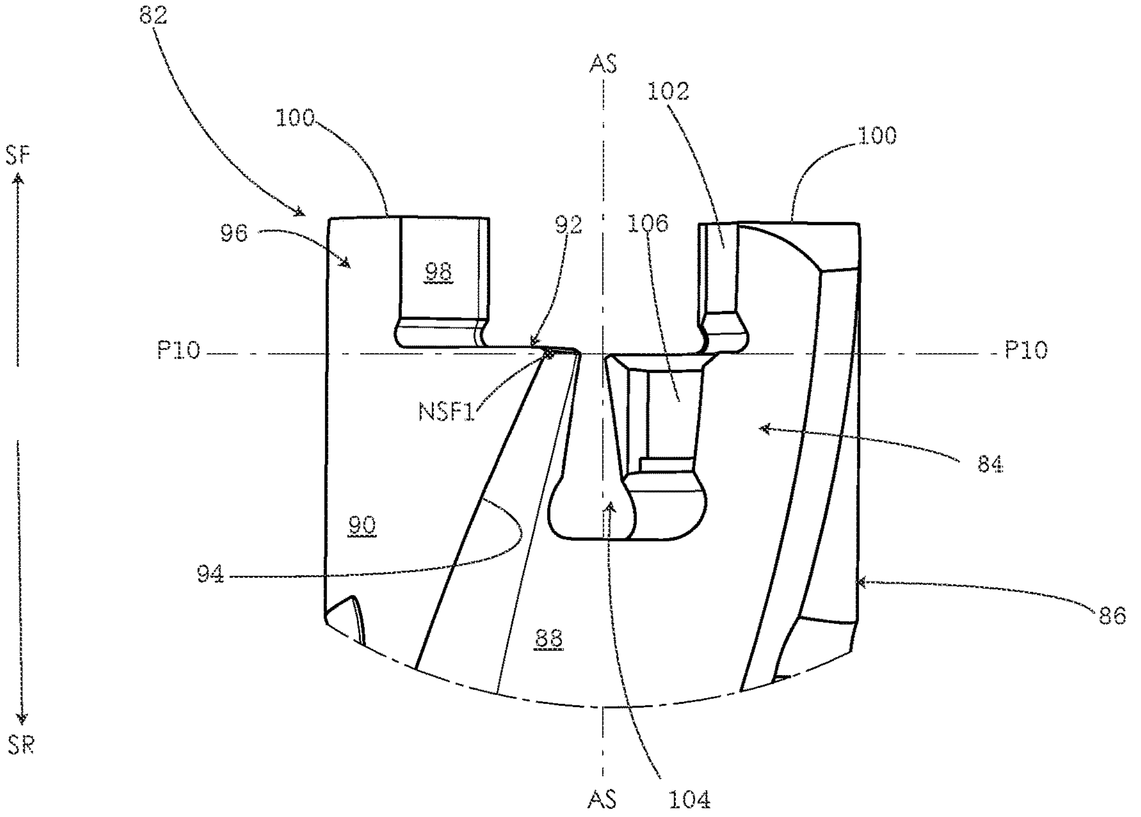
FIG. 14 is a side view of the tool shank shown in FIG. 13.

As shown in FIGS. 13 and 14, a shank peripheral surface 86 extends away from the front end 84 of the tool shank 82 along the shank axis AS.

Also, as shown in FIGS. 13 and 14, the shank peripheral surface 86 may have exactly two shank flutes 88 circumferentially alternating with exactly two shank land surfaces 90.

In some embodiments of the present invention, the two shank flutes 88 may helically extend along the shank axis AS.

Also, in some embodiments of the present invention, the tool shank 82 may exhibit 2-fold rotational symmetry about the shank axis AS.

As shown in FIG. 14, the front end 84 of the tool shank 82 may have a forward facing support surface 92.

In some embodiments of the present invention, the forward facing support surface 92 may define a tenth plane P10 perpendicular to the shank axis AS.

Also, in some embodiments of the present invention, the forward facing support surface 92 may be planar.

In an assembled position of the cutting tool 80, as shown in FIG. 12, the head axis AH and the shank axis AS may be coincidental, and the cutting head's bottom surface 30 may face the tool shank's support surface 92.

In some embodiments of the present invention, the cutting head's bottom surface 30 may be in contact with the tool shank's support surface 92.

Also, in some embodiments of the present invention, the third and tenth planes P3, P10 may be coplanar.

As shown in FIG. 14, each shank land surface 90 has a shank leading edge 94 extending axially rearwardly from an axially forwardmost shank leading endpoint NSF1.

In some embodiments of the present invention, each shank leading endpoint NSF1 may be located on or immediately adjacent the tenth plane P10.

Also, in some embodiments of the present invention, the two shank leading endpoints NSF1 may lie on an eleventh plane P11 containing the shank axis AS.

In the assembled position of the cutting tool 80, as shown in FIG. 11, the fourth and eleventh planes P4, P11 may form a first rotational offset angle $\phi 1$ of less than fifteen degrees, i.e., $\phi 1 < 15°$.

In some embodiments of the present invention, the first rotational offset angle $\phi 1$ may preferably less than five degrees, i.e., $\phi 1 < 5°$, and each head leading endpoint NHR1 may be located rotationally ahead of its adjacent shank leading endpoint NSF1.

For such embodiments of the present invention, it should be appreciated that the two chip evacuation flutes 70 are rotationally aligned with the two shank flutes 88, thus ensuring a smooth and uninterrupted flow of cutting chips axially rearwardly from the cutting head 20.

Also, for such embodiments of the present invention, it should be appreciated that cutting chips produced by each first cutting edge 32 and the adjacent rotationally leading second cutting edge 40 flow along the same chip evacuation flute 70 and into the shank flute 88 rotationally aligned therewith. By configuring the shank peripheral surface 86 to have exactly two shank flutes 88 advantageously enables the tool shank 82 to be efficiently and economically manufactured.

For embodiments of the present invention in which the cutting head 20 and the tool shank 82 are integral parts of monolithic one-piece construction (not shown), the two chip evacuation flutes 70 may merge with the two shank flutes 88.

As shown in FIGS. 10 to 14, the tool shank's front end 84 may include two circumferentially spaced apart shank protuberances 96.

In some embodiments of the present invention, each shank protuberance 96 may extend axially forward of the tool shank's support surface 92.

As shown in FIGS. 10 to 14, each shank protuberance 96 may have a drive surface 98 facing the direction of rotation RD, and in an assembled position of the cutting tool 80, each torque transmission surface 72 may be in contact with one of the drive surfaces 98.

In some embodiments of the present invention, each shank protuberance 96 may have a forward facing protuberance end surface 100, and each second gash end point NG2 may be located axially forward of one of the protuberance end surfaces 100.

As shown in FIGS. 10 to 14, each shank protuberance 96 may have a radially inward facing inner protuberance surface 102, and each inner protuberance surface 102 may face one of the second head land surfaces 42.

Also, as shown in FIGS. 10 to 14, the tool shank's front end 84 may include a central pocket recess 104, and in an assembled position of the cutting tool 80, the central mounting stem 76 may occupy the central pocket recess 104.

In some embodiments of the present invention, the central pocket recess 104 may extend axially rearward along the shank axis AS from the tool shank's support surface 92.

Also, in some embodiments of the present invention, the central pocket recess 104 may have at least two circumferentially spaced apart radially inward facing inner pocket surfaces 106, and each inner pocket surface 106 may face the central mounting stem's outer stem surface 78.

Further, in some embodiments of the present invention, as shown in FIGS. 10 to 14, the central pocket recess 104 may intersect the two shank flutes 88 to form exactly two inner pocket surfaces 106, and each inner pocket surface 106 may be in clamping contact with a corresponding stem clamping zone 108 on the mounting stem's outer stem surface 78.

For embodiments of the present invention in which the tool shank's front end 84 is configured with the central pocket recess 104, it should be appreciated that the forward facing support surface 92 may comprise two spaced apart support sub-surfaces.

Although the present invention has been described to a certain degree of particularity, it should be understood that various alterations and modifications could be made without departing from the scope of the invention as hereinafter claimed.

What is claimed is:

1. A cutting head (20) rotatable about a head axis (AH) in a direction of rotation (RD), the head axis (AH) establishing a head forward direction (HF) and a head rearward direction (HR) opposite the head forward direction (HF), the cutting head (20) comprising:

a cutting portion (22) having a cutting tip (24) with an axially forwardmost tip point (NT) contained in the head axis (AH), a pair of first cutting arms (26) circumferentially alternating with a pair of second cutting arms (28), each first cutting arm (26) having a first cutting edge (32) extending radially outwardly from the cutting tip (24), and a radially outward facing first head land surface (34), the first cutting edges (32) extending from the cutting tip (24) to two radially outermost first cutting points (NRO1) defining, in a top view of the cutting head (20), an imaginary first circle (C1) having a first diameter (D1) and a center coincident with the head axis (AH), each first cutting edge (32) including a first radially outer cutting-edge portion (36) and a first radially inner cutting-edge portion (38), and the imaginary first circle (C1) lying in a first plane (P1) perpendicular to the head axis (AH), and each second cutting arm (28) having a second cutting edge (40) extending radially outwardly from the cutting tip (24), and a radially outward facing second head land surface (42), the second cutting edges (40) extending to two radially outermost second cutting points (NRO2) defining, in a top view of the cutting head (20), an imaginary second circle (C2) having a second diameter (D2) and a center coincident with the head axis (AH), the imaginary second circle (C2) lying in a second plane (P2) perpendicular to the head axis (AH), wherein:

the first diameter (D1) is greater than the second diameter (D2), in a cross-section taken in a fifth plane (P5) containing the head axis (AH) and intersecting the first cutting arms (26), each first cutting edge (32) has a first cutting profile (PC1) and each first radially inner cutting-edge portion (38) has a first inner cutting profile (PCI1), in a cross-section taken in a sixth plane (P6) containing the head axis (AH) and intersecting the second cutting arms (28), each second cutting edge (40) has a second cutting profile (PC2), the first inner cutting profile (PCI1) is identical to the second cutting profile (PC2), each first radially inner cutting-edge portion (38) is formed at the intersection of a first inner rake surface (50) facing the direction of rotation (RD), and an axially forward-facing first inner relief surface (52), each second cutting edge (40) is formed at the intersection of a second rake surface (56) facing the direction of rotation (RD), and an axially forward facing second relief surface (58), each first inner rake surface (50) is formed on a first point thinning gash (54), and each second rake surface (56) is formed on a second point thinning gash (60).

2. The cutting head (20) according to claim 1, wherein:

the pair of first cutting edges (32) exhibit 2-fold rotational symmetry about the head axis (AH).

3. The cutting head (20) according to claim 1, wherein:

each first cutting edge (32) monotonically extends axially rearwardly from the cutting tip (24) to its radially outermost first cutting point (NRO1).

4. The cutting head (20) according to claim 1, wherein:

the pair of second cutting edges (40) exhibit 2-fold rotational symmetry about the head axis (AH).

5. The cutting head (20) according to claim 1, wherein:

each second cutting edge (40) monotonically extends axially rearwardly from the cutting tip (24) to its radially outermost second cutting point (NRO2).

6. The cutting head (20) according to claim 1, wherein:

the second diameter (D2) is greater than thirty percent of the first diameter (D1) and less than seventy percent of the first diameter (D1).

7. The cutting head (20) according to claim 1, wherein:

an imaginary third cylinder (S3) having a circular cross-section centered about the head axis (AH) intersects the pair of first radially inner cutting-edge portions (38) at two first intersection points (N1) and the pair of second cutting edges (40) at two second intersection points (N2);

in a cross-section taken in a seventh plane (P7) tangential to the imaginary third cylinder (S3) and containing one of the first intersection points (N1), the first inner rake surface (50) forms an acute first inner rake angle (a1) with a first imaginary vertical straight line (LV1) containing said one of the first intersection points (N1) and parallel to the head axis (AH); and in a cross-section taken in an eighth plane (P8) tangential to the imaginary third cylinder (S3) and containing one of the second intersection points (N2), the second rake surface (56) forms an acute second rake angle (a2) with a second imaginary vertical straight line (LV2) containing said one of the second intersection points (N2) and parallel to the head axis (AH), wherein:

the first inner rake angle (α1) and the second rake angle (α2) are equal.

8. The cutting head (20) according to claim 7, wherein:

in the cross-section taken in the seventh plane (P7), the first inner relief surface (52) forms an acute first inner relief angle (β1) with a first imaginary horizontal straight line (LH1) containing said one of the first intersection points (N1) and perpendicular to the first imaginary vertical straight line (LV1); and in the cross-section taken in the eighth plane (P8), the second relief surface (58) forms an acute second relief angle (B2) with a second imaginary horizontal straight line (LH2) containing said one of the second intersection points (N2) and perpendicular to the first imaginary vertical straight line (LV1), wherein:

the first inner relief angle (B1) and the second relief angle (B2) are equal.

9. The cutting head (20) according to claim 1, wherein:

in a cross-section taken in a ninth plane (P9) perpendicular to the head axis (AH) and intersecting the pair of first radially inner cutting-edge portions (38) and the pair of second cutting edges (40), an imaginary third circle (C3) inscribes the two first point thinning gashes (54) and an imaginary fourth circle (C4) inscribes the two second point thinning gashes (60), and wherein:

the imaginary third and fourth circles (C3, C4) are coincident.

10. The cutting head (20) according to claim 1, wherein:

each second head land surface (42) is intersected by one of the first point thinning gashes (54) and one of the second point thinning gashes (60).

11. The cutting head (20) according to claim 1, wherein:

each second cutting arm (28) has an axially forward facing second front surface (62), and each second front surface (62) is intersected by the adjacent rotationally trailing first point thinning gash (54).

12. The cutting head (20) according to claim 1, wherein:

each first cutting arm (26) has an axially forward facing first front surface (64), and each first front surface (64) is intersected by the adjacent rotationally trailing second point thinning gash (60).

13. The cutting head (20) according to claim 12, wherein:

each first radially outer cutting-edge portion (36) is formed at the intersection of a first outer rake surface (66) facing the direction of rotation (RD), and an axially forward-facing first outer relief surface (68), and each first outer relief surface (68) is disposed on one of the first front surfaces (64).

14. The cutting head (20) according to claim 13, wherein:

the first outer rake surface (66) is formed on an axially rearwardly extending chip evacuation flute (70).

15. The cutting head (20) according to claim 1, wherein:

the cutting head (20) exhibits 2-fold rotational symmetry about the head axis (AH).

16. The cutting head (20) according to claim 1, wherein:

an imaginary second cylinder (S2) has a circular cross-section centered about the head axis (AH) and an imaginary second cylinder surface (46), the imaginary second cylinder (S2) has a second cylinder diameter (DS2) greater than the second diameter (D2) and less than the first diameter (D1), the pair of second cutting arms (28) are located entirely inside the imaginary second cylinder (S2), and the imaginary second cylinder surface (46) intersects the pair of first cutting arms (26).

17. The cutting head (20) according to claim 16, wherein:

the imaginary second cylinder surface (46) intersects the pair of first radially outer cutting-edge portions (36).

18. The cutting head (20) according to claim 1, wherein:

the first cutting profile (PC1) has a first cross-sectional profile width of W1; and the first inner cutting profile (PCI1) and the second cutting profile (PC2) both have a second cross-sectional profile width of W2; and $W1*0.30<W2<W1*0.70$.

19. A rotary cutting tool (80) comprising:

an elongated tool shank (82) having a shank axis (AS) establishing a shank forward direction (SF), and a shank rearward direction (SR) opposite the shank forward direction (SF), and a cutting head (20) rotatable about a head axis (AH) in a direction of rotation (RD), the head axis (AH) establishing a head forward direction (HF) and a head rearward direction (HR) opposite the head forward direction (HF), the cutting head (20) comprising:

a cutting portion (22) having a cutting tip (24) with an axially forwardmost tip point (NT) contained in the head axis (AH), a pair of first cutting arms (26) circumferentially alternating with a pair of second cutting arms (28), each first cutting arm (26) having a first cutting edge (32) extending radially outwardly from the cutting tip (24), and a radially outward facing first head land surface (34), the first cutting edges (32) extending from the cutting tip (24) to two radially outermost first cutting points (NRO1) defining, in a top view of the cutting head (20), an imaginary first circle (C1) having a first diameter (D1) and a center coincident with the head axis (AH), each first cutting edge (32) including a first radially outer cutting-edge portion (36) and a first radially inner cutting-edge portion (38), and the imaginary first circle (C1) lying in a first plane (P1) perpendicular to the head axis (AH), and each second cutting arm (28) having a second cutting edge (40) extending radially outwardly from the cutting tip (24), and a radially outward facing second head land surface (42), the second cutting edges (40) extending to two radially outermost second cutting points (NRO2) defining, in a top view of the cutting head (20), an imaginary second circle (C2) having a second diameter (D2) and a center coincident with the head axis (AH), the imaginary second circle (C2) lying in a second plane (P2) perpendicular to the head axis (AH), wherein:

the first diameter (D1) is greater than the second diameter (D2), in a cross-section taken in a fifth plane (P5) containing the head axis (AH) and intersecting the first cutting arms (26), each first cutting edge (32) has a first cutting profile (PC1) and each first radially inner cutting-edge portion (38) has a first inner cutting profile (PCI1), in a cross-section taken in a sixth plane (P6) containing the head axis (AH) and intersecting the second cutting arms (28), each second cutting edge (40) has a second cutting profile (PC2), the first inner cutting profile (PCI1) is identical to the second cutting profile (PC2), the cutting head (20) is disposed at a front end (84) of the tool shank (82), a shank peripheral surface (86) extends away from the front end (84) of the tool shank (82) along the shank axis (AS), and the shank peripheral surface (86) has exactly two shank flutes (88) circumferentially alternating with exactly two shank land surfaces (90).

20. The cutting tool (80) according to claim 19, wherein:

the front end (84) of the tool shank (82) has a forward facing support surface (92), the cutting portion (22) of the cutting head (20) has a rearward facing bottom surface (30), and the cutting head (20) is releasably secured to the front end (84) of the tool shank (82), wherein:

the head axis (AH) and the shank axis (AS) are coincidental, and the bottom surface (30) of the cutting head (20) faces the tool shank's support surface (92).

21. The cutting tool (80) according to claim 20, wherein:

each first head land surface (34) has a head leading edge (48) extending axially rearwardly from its associated radially outermost first cutting point (NRO1) to an axially rearwardmost head leading endpoint (NHR1), each shank land surface (90) has a shank leading edge (94) extending axially rearwardly from an axially forwardmost shank leading endpoint (NSF1), and wherein:

the two head leading endpoints (NHR1) lie on a fourth plane (P4) containing the head axis (AH), the two shank leading endpoints (NSF1) lie on an eleventh plane (P11) containing the shank axis (AS), and the fourth and eleventh planes (P4, P11) form a first rotational offset angle (§ 1) of less than fifteen degrees.

22. The cutting tool (80) according to claim 20, wherein:

the bottom surface (30) of the cutting portion (22) is in contact with the support surface (92) of the tool shank (82).

23. The cutting tool (80) according to claim 20, wherein:

each first cutting arm (26) includes a torque transmission surface (72) facing opposite the direction of rotation (RD), the front end (84) of the tool shank (82) includes two circumferentially spaced apart shank protuberances (96), each shank protuberance (96) having a drive surface (98) facing the direction of rotation (RD), and each torque transmission surface (72) is in contact with one of the drive surfaces (98).

* * * * *